(12) United States Patent
Yau

(10) Patent No.: US 10,529,973 B2
(45) Date of Patent: Jan. 7, 2020

(54) STANDARDIZED RECHARGEABLE BATTERY CELL

(71) Applicant: Tricopian, LLC, Del Mar, CA (US)

(72) Inventor: Chi W. Yau, Escondido, CA (US)

(73) Assignee: Tricopian, LLC, Del Mar, CA (US)

( * ) Notice: Subject to any disclaimer, the term of this patent is extended or adjusted under 35 U.S.C. 154(b) by 70 days.

(21) Appl. No.: 14/912,844

(22) PCT Filed: Aug. 22, 2014

(86) PCT No.: PCT/US2014/052392
§ 371 (c)(1),
(2) Date: Feb. 18, 2016

(87) PCT Pub. No.: WO2015/027215
PCT Pub. Date: Feb. 26, 2015

(65) Prior Publication Data
US 2016/0197337 A1    Jul. 7, 2016

Related U.S. Application Data

(60) Provisional application No. 61/868,842, filed on Aug. 22, 2013.

(51) Int. Cl.
*H01M 2/34* (2006.01)
*H01M 2/10* (2006.01)
(Continued)

(52) U.S. Cl.
CPC .............. *H01M 2/34* (2013.01); *H01M 2/105* (2013.01); *H01M 2/1055* (2013.01);
(Continued)

(58) Field of Classification Search
CPC ...... H01M 2/1055; H01M 2/105; H01M 2/34; H02J 7/0004; H02J 7/0042
(Continued)

(56) References Cited

U.S. PATENT DOCUMENTS 2,119,063 A     5/1938  Wagner
4,700,375 A    10/1987  Reed
(Continued)

FOREIGN PATENT DOCUMENTS

CN     101083011 A    12/2007
EP     0 577 121 A1    1/1994
(Continued)

OTHER PUBLICATIONS

Law Man Hon, Machine Translation of WO-2013013360-A1, Jan. 2013 (Year: 2013).*
(Continued)

*Primary Examiner* — Sean P Cullen
(74) *Attorney, Agent, or Firm* — Knobbe, Martens, Olson & Bear, LLP

(57) ABSTRACT

Applications for use with a rechargeable power unit. In one embodiment, the rechargeable power unit is configured to be releasably connected to one or more interchangeable attachments having an electric functionality. In one embodiment, an electric device is configured having a compartment and connection portion configured to receive and use the rechargeable power unit as a power source. In some embodiments, the rechargeable power unit can be obtained or exchanged at a battery exchange machine.

10 Claims, 7 Drawing Sheets

(51) Int. Cl.
  *H01M 10/42* (2006.01)
  *H01M 10/04* (2006.01)
  *H02J 7/00* (2006.01)

(52) U.S. Cl.
  CPC ..... *H01M 10/0436* (2013.01); *H01M 10/425* (2013.01); *H02J 7/0004* (2013.01); *H02J 7/0042* (2013.01); *H01M 2010/4271* (2013.01); *H01M 2220/30* (2013.01)

(58) Field of Classification Search
  USPC ........................................ 429/7, 96, 97, 100
  See application file for complete search history.

(56) References Cited

U.S. PATENT DOCUMENTS

| | | | |
|---|---|---|---|
| 4,907,250 | A | 3/1990 | Ricks |
| 5,298,346 | A | 3/1994 | Gyenes et al. |
| 5,307,000 | A | 4/1994 | Podrazhansky et al. |
| 5,349,535 | A | 9/1994 | Gupta |
| 5,485,090 | A | 1/1996 | Stephens |
| 5,489,835 | A | 2/1996 | Stephens |
| 5,525,439 | A | 6/1996 | Huhndorff et al. |
| 5,544,784 | A | 8/1996 | Malaspina |
| 5,572,110 | A | 11/1996 | Dunstan |
| 5,621,297 | A | 4/1997 | Feldstein |
| 5,631,536 | A | 5/1997 | Tseng |
| 5,694,019 | A | 12/1997 | Uchida et al. |
| 6,154,006 | A | 11/2000 | Hatanaka et al. |
| 6,191,554 | B1 | 2/2001 | Nakane |
| 6,303,248 | B1 | 10/2001 | Peterson |
| 6,370,844 | B1 | 4/2002 | Stricker |
| 6,531,244 | B1* | 3/2003 | Ryan, Jr. ............. H01M 2/1033 429/100 |
| 6,618,644 | B2 | 9/2003 | Bean |
| 6,764,003 | B1 | 7/2004 | Martschitsch et al. |
| 6,822,422 | B2 | 11/2004 | Sagawa |
| 6,862,496 | B2 | 3/2005 | Fukuoka et al. |
| 7,119,517 | B2 | 10/2006 | Mikuriya et al. |
| 7,491,466 | B2 | 2/2009 | Feddrix et al. |
| 7,888,913 | B1 | 2/2011 | Marty |
| 8,055,919 | B2 | 11/2011 | Magnusson |
| 9,096,141 | B2 | 8/2015 | Soong et al. |
| 2001/0001766 | A1 | 5/2001 | Humphreys et al. |
| 2001/0037207 | A1 | 11/2001 | Dejaeger |
| 2003/0055735 | A1 | 3/2003 | Cameron et al. |
| 2003/0120380 | A1 | 6/2003 | Bean |
| 2004/0113588 | A1 | 6/2004 | Mikuriya et al. |
| 2004/0189245 | A1 | 9/2004 | Teraoka et al. |
| 2004/0229119 | A1* | 11/2004 | Lin ..................... H01M 2/1022 429/164 |
| 2005/0001591 | A1 | 1/2005 | Nagamine et al. |
| 2005/0102233 | A1 | 5/2005 | Park et al. |
| 2005/0236266 | A1 | 10/2005 | Poole et al. |
| 2006/0108979 | A1 | 5/2006 | Daniel et al. |
| 2006/0197502 | A1 | 9/2006 | Kaminsky et al. |
| 2006/0216586 | A1 | 9/2006 | Tucholski |
| 2006/0275656 | A1 | 12/2006 | Feddrix et al. |
| 2007/0069153 | A1 | 3/2007 | Pai-Paranjape et al. |
| 2007/0273327 | A1 | 11/2007 | Daniel et al. |
| 2008/0084178 | A1 | 4/2008 | Dowd et al. |
| 2008/0136378 | A1 | 6/2008 | Iwahana et al. |
| 2008/0160392 | A1 | 7/2008 | Toya et al. |
| 2008/0228613 | A1 | 9/2008 | Alexander |
| 2008/0281732 | A1 | 11/2008 | Yamada |
| 2008/0305387 | A1* | 12/2008 | Murray .................. B25F 5/02 429/100 |
| 2009/0092860 | A1 | 4/2009 | Yamamoto et al. |
| 2009/0153101 | A1 | 6/2009 | Meyer et al. |
| 2009/0212736 | A1 | 8/2009 | Baaman et al. |
| 2009/0212781 | A1 | 8/2009 | Bertness et al. |
| 2009/0233159 | A1 | 9/2009 | Phillips et al. |
| 2009/0281891 | A1 | 11/2009 | Walker et al. |
| 2010/0052609 | A1 | 3/2010 | Daniel et al. |
| 2010/0169231 | A1 | 7/2010 | Bowles et al. |
| 2010/0205463 | A1 | 8/2010 | Magnusson |
| 2010/0231142 | A1* | 9/2010 | Yoon ....................... F21L 4/027 315/312 |
| 2010/0247998 | A1 | 9/2010 | Hostler et al. |
| 2010/0271814 | A1* | 10/2010 | Messinger ............. F21L 4/005 362/183 |
| 2010/0274904 | A1 | 10/2010 | Schirar et al. |
| 2010/0295503 | A1 | 11/2010 | Bourilkov |
| 2010/0312380 | A1 | 12/2010 | Lowe |
| 2010/0320967 | A1 | 12/2010 | Sa |
| 2011/0057624 | A1 | 3/2011 | Rizzo |
| 2011/0117389 | A1* | 5/2011 | Larsen ................ H01M 2/1033 429/1 |
| 2011/0181242 | A1 | 7/2011 | Lee |
| 2011/0225098 | A1 | 9/2011 | Wolff et al. |
| 2012/0033416 | A1* | 2/2012 | Ballard ................... F21L 4/027 362/202 |
| 2012/0074893 | A1 | 3/2012 | Cole |
| 2012/0109797 | A1 | 5/2012 | Shelton et al. |
| 2012/0276428 | A1 | 11/2012 | Pendry |
| 2013/0063073 | A1 | 3/2013 | Kawasaki et al. |
| 2013/0181661 | A1 | 7/2013 | Workman |
| 2014/0199570 | A1* | 7/2014 | Cho ..................... H01M 2/1033 429/93 |
| 2014/0310165 | A1 | 10/2014 | Yau |
| 2015/0045947 | A1 | 2/2015 | Yau |
| 2015/0140379 | A1 | 5/2015 | Yau |
| 2016/0028263 | A1 | 1/2016 | Yau |

FOREIGN PATENT DOCUMENTS

| | | |
|---|---|---|
| EP | 0768724 A2 | 4/1997 |
| EP | 1136961 A1 | 9/2001 |
| EP | 1391961 A1 | 2/2004 |
| EP | 2015381 A2 | 1/2009 |
| EP | 2328173 A1 | 6/2011 |
| GB | 2042787 A | 9/1980 |
| JP | H10-221418 | 8/1998 |
| JP | H11-031485 A | 2/1999 |
| JP | 2001023037 A | 1/2001 |
| JP | 2001096236 A | 4/2001 |
| JP | 2001222991 A | 8/2001 |
| JP | 2001266954 | 9/2001 |
| JP | 2010-211754 | 9/2010 |
| JP | 2011-054542 | 3/2011 |
| JP | 2011096233 A | 5/2011 |
| JP | 2011103104 | 5/2011 |
| JP | 2011210663 A | 10/2011 |
| JP | 2012-055051 | 3/2012 |
| JP | 2012-070480 | 4/2012 |
| JP | 2002-199605 | 7/2012 |
| WO | WO 2001/095454 A1 | 12/2001 |
| WO | WO 01/54984 A1 | 8/2004 |
| WO | WO 2009/105595 A2 | 8/2009 |
| WO | WO 2009/111743 | 9/2009 |
| WO | WO-2013013360 A1 * | 1/2013 .......... H01M 2/1022 |
| WO | WO 2013/165597 A1 | 11/2013 |

OTHER PUBLICATIONS

International Search Report and Written Opinion dated Dec. 5, 2014 for Application No. PCT/US2014/052392.
International Search Report and Written Opinion, filed in PCT/US2013/065308 dated May 7, 2014.
International Search Report and Written Opinion, filed in PCT/US2013/031667 dated Jul. 19, 2013.
International Search Report and Written Opinion, filed in PCT/US2013/030578 dated Jul. 9, 2013.
International Search Report and Written Opinion, filed in PCT/US2012/065326 dated Feb. 6, 2013.

* cited by examiner

STANDARDIZED RECHARGEABLE BATTERY CELL

BACKGROUND

Field of the Invention

This relates to the field of portable, rechargeable, electric power supplies.

Description of the Related Art

Batteries power a variety of devices. As more devices become battery powered, consumer demand for batteries increases. Current applications or appliances usually require a battery or power source having a standard form factor, using metal contacts to transfer power from the battery or electrical cell to the circuitry of the application or appliance. As most standard form factor batteries are non-rechargeable, and rechargeable batteries are expensive and require additional charging equipment, industry manufactures and disposes of ever greater numbers of batteries. This can include acquisition and waste of precious metals or toxic materials such as mercury, cadmium, or lead. An easily rechargeable power source for use in standardized applications is therefore needed and is desirable.

SUMMARY

In one aspect, a rechargeable power unit comprises an electrochemical cell; an input/output module in electrical connection with the electrochemical cell; an output port configured to receive a connector of an electrical device, the output port in electrical contact with the input/output module; an input port configured to receive a charging connector, the input port in electrical contact with the input/output module; a casing housing the electrochemical cell and the input/output module; and an attachment feature connected to the casing, wherein the attachment feature is configured to releasably engage a corresponding feature on an electrical device.

In some embodiments, the rechargeable power unit further comprises jacket disposed on the casing, the insulating jacket comprising a unique computer readable identifier.

In another aspect, a system using a rechargeable power unit with an interchangeable accessory comprises a rechargeable power unit comprising an electrochemical cell; an input/output module in electrical connection with the electrochemical cell; an output port configured to receive a connector, the output port in electrical contact with the input/output module; an input port configured to receive a charging connector, the input port in electrical contact with the input/output module; a casing housing the electrochemical cell and the input/output module; and an attachment feature connected to the casing, wherein the attachment feature is configured to releasably engage a corresponding feature on an electrical device; an interchangeable attachment comprising: an electrical device; a connector configured to be received in the output port; a circuit module in electrical connection with the connector, wherein the circuit comprises circuitry for transmitting electrical power from the cell to the electrical device.

In another aspect, a system using a rechargeable power unit with an electric device comprises a rechargeable power unit comprising an electrochemical cell; an input/output module in electrical connection with the electrochemical cell; an output port configured to receive a connector, the output port in electrical contact with the input/output module; an input port configured to receive a charging connector, the input port in electrical contact with the input/output module; a casing housing the electrochemical cell and the input/output module; a battery compartment comprising a connector in electrical contact with an electric device, wherein the connector is configured to be received into the output port and provide a path for current flow from the input/output module to the electric device; and a housing partially surrounding the connector, the housing configured to receive a portion of the rechargeable power unit as the connector is received into the output port.

In some embodiments, the casing comprises an indexing feature.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1A:
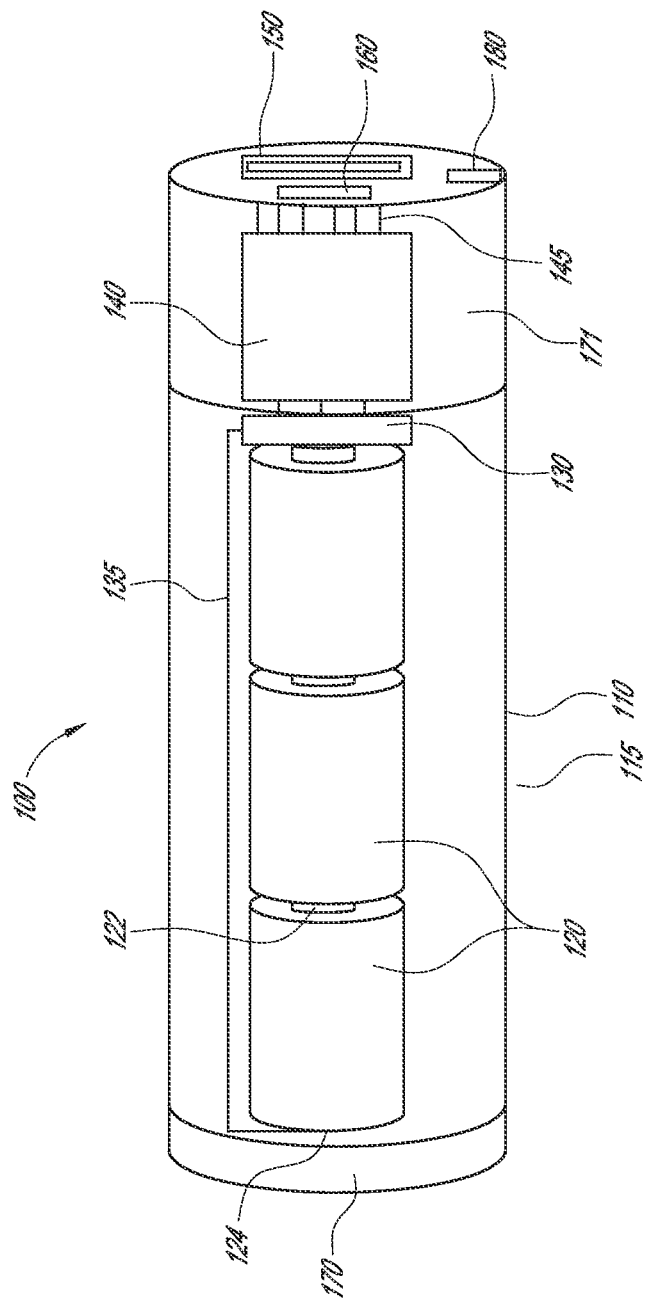
FIG. 1A is a cutaway view of an embodiment of a rechargeable power unit.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Embodiments of a rechargeable power unit which can be used in standardized applications or with various power accessories is disclosed. Also disclosed is a system and method of providing rechargeable power units as an exchange system, wherein a user may pay for only the energy expended from a rechargeable power unit. Although certain embodiments of the present invention are shown and described in detail, it should be understood that various changes and modifications may be made without departing from the scope of the appended claims. The scope of the present application is in no way limited to the number of constituting components, the materials thereof, the quantities thereof, the relative arrangement thereof, etc.

For ease of description and illustration, the term "standard form factor" or its variants may be used. Typical cylindrical batteries such as AAA, AA, C and D may be described as having "standard form factors." However, one of skill in the art will recognize that batteries of many shapes and sizes having less common form factors including 9V, prismatic batteries, or coin-shaped batteries may be comprise the features described herein without departing from the scope of the present disclosure. Also, it is contemplated that some embodiments may not include all of the recited materials, thus sub-combinations of the listed materials are contemplated.

In some embodiments, the rechargeable power unit may be similar to those described in U.S. patent application No. 61/643,026 and/or PCT Application PCT/US2013/031667, the entire contents of which are herein incorporated by reference.

FIG. 1A depicts a cutaway view of an embodiment of a rechargeable power unit. The rechargeable power unit 100 comprises an outer casing 110, one or more cells 120, a cell connector 130, a power input/output module 140, an output port 150, and an input port 160. The outer casing 110 houses and provides support for the internal components of the rechargeable power unit 100. The outer casing 110 may be constructed of an electrically non-conducting material, such as plastic, composite, carbon fiber, cardboard, or other desired material which provides rigidity, maintains its shape, and protects the internal components of the rechargeable power unit 100. In some embodiments, the outer casing 110 may comprise a metal or other electrically conductive material. The casing 110 is coated with a cover 115, which can be made of a rubber, polymer, such as polyvinylchloride, or any other desired electrically isolating material. The cover 115 can be a continuous piece which substantially encloses the casing 110, and inhibits access to the casing 110 and/or the internals of the rechargeable power unit 100. In some embodiments, the cover has a logo, advertisement, company name, promotional information, or advertisement printed thereon.

One or more cells 120 are housed within the outer casing 110. Each of the one or more cells 120 may be a discrete electrochemical cell, and may be electrically connected to the other of the plurality of cells 120 either in series or in parallel, as desired. For example, the one or more cells 120 may each have a positive terminal 122 and a negative terminal 124. The positive terminal 122 of one cell 120 maybe in electrical contact with the negative terminal 124 of an adjacent cell 120 to connect the cells 120 in series. To connect the cells in parallel, the positive terminals 122 of the cells 120 may be electrically connected to each other and the negative terminals 124 of the cells 120 may be electrically connected to each other. In some embodiments, the one or more cells 120 may be a single electrochemical cell, or a single cell unit comprising one or more individual but permanently connected electrochemical cells. In some embodiments, the one or more cells 120 may be rechargeable batteries having a standard form factor such as AAA, AA, C, D, CR-123, rectangular 9V, and others. The cells may be of a variety of battery chemistries, such as NiMH, NiCd, Li-ion, Li-Polymer, and others. In some embodiments, the cells 120 are not rechargeable. In some embodiments, the cells may advantageously be Li-ion 18650 type cells, which have high capacity and low self-discharge rates. In some embodiments, the one or more cells 120 may have a 1000, 2000, 3000, 4000, 5000 or greater mAh capacity. Although cylindrical cells 120 are depicted in FIG. 1A, a person of skill in the art would understand that the cells 120 may be of any desired form factor, such as planar, rectangular, etc., and the outer casing 110 may be of any geometry, size, or shape, and may be based on the form factor of the cells 120 housed within.

The one or more cells 120 are in electrical contact with a cell connector 130. Specifically, in some embodiments, the positive terminal 122 of one or more cells 120 may be in electrical contact with a positive terminal portion (not shown) of the cell connector 130. The cell connector 130 has a terminal connector 135 extending from a negative terminal portion (not shown) of the cell connector 130 that may extend along the cell 120 and contact the negative terminal 124 of the cell 120. In some embodiments, the terminal connector 135 may be in contact with the positive terminal 122 of the cell 120 and the negative terminal 124 of the cell 120 may be in contact with the positive terminal portion of the cell connector 130. The cell connector provides an electrical interface between the one or more cells 120 and the power input/output module 140. The cell connector 130 provides contacts or terminals which contact the positive and negative terminals 122, 124 of the one or more cells 120 to create a circuit to facilitate current flow when a load is attached to the power input/output module 140. The cell connector also provides an electrical interface with the power input/output module 140, and facilitates the transfer of power from the one or more cells 120 to the power input/output module 140. Various configurations for the cell connector 130 may be used, and a person of skill in the art will understand how to facilitate the connection of the one or more cells 120 to the power input/output module 140 based on the form factor of the one or more cells 120.

The power input/output module 140 is electrically connected to the cell connector 130 and connection wires 145, which ultimately connect to the output port 150 and the input port 160. The power input/output module 140 may comprise circuitry configured to transform the voltage and/or current supplied by the cells 120 into an appropriate output voltage and/or current. The appropriate voltage and/or output current from the output port 150 may be determined or set according to the intended application for the rechargeable power unit 100. In some embodiments, the power input/output module 140 transforms the voltage and/or current values which correspond to the universal serial bus (USB) standard. The power input/output module 140 may also be configured to provide a charging voltage and/or current to the one or more cells 120. Where the one or more cells 120 are rechargeable, the power input/output module 140 is configured to receive a charging voltage and/or current from input port 160, transform the voltage and/or current as required for charging the one or more cells 120, and transmit the charging voltage and/or current to the one or more cells 120.

The power input/output module 140 may also comprise internal circuitry coupled to a cell monitoring circuit (not shown) capable of performing monitoring functions and storing the monitoring results in an internal memory. For example, the power input/output module 140 may be configured to calculate amp hours discharged, amp hours charged, number of charge/discharge cycles, total current in or out of the one or more cells 120. In some embodiments, the internal circuitry of the power input/output module 140 may be configured to calculate capacity, state of charge, or cell health values, and store the same for later reading by diagnostic equipment, or in a battery vending machine or battery exchange machine. The exchange machine may be similar to those described in U.S. Patent Application Nos. 61/560,672, 61/659,674, and 61/613,415, and/or international applications PCT/US2012/065326 and PCT/US2013/030578, which are all hereby incorporated by reference in their entirety. The battery exchange machines can be configured to receive and electronically communicate with the rechargeable power units 100. In some embodiments, the battery exchange machines include a display thereon, capable of displaying a message received from or associated with the rechargeable power unit 100. In some embodiments, the power input/output module 140 may comprise a battery monitoring chip similar to the DS2438, manufactured by Dallas Semiconductor.

In some embodiments, the internal memory may be used to store an identification code, such as a serial number, or other unique data. In some embodiments, subscriber or purchaser information, for example, an identifier of a party who has requested, ordered, or vended the received the rechargeable power unit 100 may be stored in or written to the internal memory in the power input/output module 140. In some embodiments, a unique identifier may be on or embedded in the casing 110. For example, a computer readable code may be printed on the casing 110 which uniquely identifies the rechargeable power unit 100. In some embodiments, a writeable RFID tag may be embedded in the casing, which also uniquely identifies the rechargeable power unit 100, and may also encode or provide additional information, such as number of charge/discharges, number of swaps in a battery exchange system have occurred, the manufacture date, and any other desired information about the rechargeable power unit 100. This same information may be stored within the power input/output module 140.

The output port 150 receives power from the power input/output module via connection wiring 145. A person of skill in the art will understand how to configure the connection wiring 145 to accommodate a variety of styles or types of output ports 150. The output port 150 may advantageously be a USB-type port. With a USB-type output port 150, a user may insert a USB cable into the output port 150, and may use the rechargeable power unit 100 to charge virtually any portable electronic device having a USB, microUSB, miniUSB, 30-pin, Apple Lightning® port, or any other desired interface. For example, mobile phones, MP3 players, tablet computers, and many other electronic devices are configured for USB charging and can be charged using the rechargeable power unit 100. In some embodiments, the output port 150 may be a proprietary port for use with a proprietary connector or proprietary discharging interface. In some embodiments, a cable may be fixedly attached or inserted into output port, the cable having a USB, microUSB, miniUSB, 30-pin, Apple Lightning® port, or any other desired interface connecter disposed on one end. In some embodiments, the output port 150 may comprise a cable having a USB, microUSB, miniUSB, 30-pin, Apple Lightning® port, or any other desired interface connector attached thereto. In this case, there is no need for an additional cable in order to use the rechargeable power unit 100, as the cable is built in.

The rechargeable power unit 100 may have one or more status indicator lights. These lights may be located on the casing, or proximate the output port 150 and input port 160, or in any other desired location. The one or more status indicator lights can be used to indicate the status of the rechargeable power unit 100. The status indicator lights can be LED-type lights which are powered through circuitry in the power input/output power module 140. For example, the status indicator light may illuminate with a first color when the rechargeable power unit 100 is being charged. The status indicator light may illuminate with a second color when the rechargeable power unit 100 is being discharged. In some embodiments, two separate status indicator lights may be used, one during charging and another during discharging. In some embodiments, the rechargeable power unit 100 may have a series of status indicator lights which can be used to indicate state of charge. For example, three status indicator lights may be used to indicate state of charge. When the rechargeable power unit is fully charged, all three status indicator lights can be lit. When ⅓ of the capacity has discharged, one of the three status indicator lights may be extinguished, leaving two status lights illuminated. When only ⅓ of the charge is left, only one status indicator is illuminated. Although 3 status indicator lights are described, a person of skill in the art will understand that any number of status indicator lights may be used to indicate the state of charge of the rechargeable power unit 100.

In some embodiments, the rechargeable power unit 100 may have the form factor of a standard size battery. For example, the outer casing may be sized and shaped like a standard AAA, AA, C, D, and/or 9V cell. The output port 150 may be a metal concavity or terminal such as exists on the standard AAA, AA, C, D, and 9V cells. In such embodiments, the rechargeable power unit 100 may be inserted into a slot designed for one of many standard form factor cells.

The input port 160 may be configured to receive a charging signal sufficient to recharge the one or more cells 120. In some embodiments, the input port 160 may comprise a USB, miniUSB, or microUSB, or any other type port. In some embodiments, the input port 160 may not be present, and thus a user would have no ability to recharge the one or more cells 120 via the power input/output module 140. In some embodiments the input port 160 may be a proprietary input port 160.

Input port 160 may be configured to only allow charging of the one or more cells 120 under certain circumstances. For example, a charging code may be embedded or stored in the memory of the power input/output module 140. When a power source or power supply is plugged into the input port 160, the power supply or source must send an authentication code, a unique voltage pattern, handshake data, or other similar information to the input port 160 and the power input/output module 140. In order for the power input/output module 140 to allow charging of the cells 120, or to allow current flow into the cells 120, the authentication code, handshake data or other information must be verified or matched to the stored information. Only after verification, will the power input/output module 140 allow charging of the cells 120. This may be accomplished, for example, in a battery exchange vending machine. The exchange vending machine may have the correct authentication codes, handshake data, or other information required to initiate charging of the cells 120.

In an environment where a plurality of rechargeable power units 100 are used, each rechargeable power unit 100 may have a unique authentication code, handshake, or other information in order to commence charging. When the rechargeable power unit is presented to a battery exchange machine, the battery exchange machine may read a unique identifier, (e.g., a barcode, an RFID tag, a QR code, or any other computer readable code) on the exterior of the rechargeable power unit 100. Access to the exchange machine may be granted by scanning a code or tag on the rechargeable power unit 100. For example, the cover 115 may have an RFID tag or near field communication (NFC) chip embedded within. When the rechargeable power unit 100 is presented to an exchange machine, such as by passing the rechargeable power unit 100 over a surface of the exchange machine, the exchange machine may read and positively identify the RFID tag or the NFC chip, and allow access to a return receptacle on the exchange machine. Further, if a user subscribes to an exchange service, the user's identity may be programmed into the RFID tag or the NFC chip, by which the exchange machine can identify the user and access the user's account for a charging or exchange transaction. In some embodiments, the exchange machine may have a user interface which has several areas capable of recognizing an RFID tag or a NFC chip. The areas may correspond to different commands or requests for the user, such as "return," "swap," or "get a new one." In this way, a user can pass the rechargeable power unit 100 over the area corresponding to the action the user desires. For example, if the user desires to swap a depleted or used rechargeable power unit 100 for a fresh, charged one, the user can pass the rechargeable power unit 100 over the area having "swap" or other similar indicators thereon. When the "swap" area detects and positively identifies or recognizes the rechargeable power unit 100 based on the RFID tag or the NFC chip, the circuitry of the exchange machine is activated to accomplish the desired action. If an RFID tag or an NFC chip is not recognized by the exchange machine, then no action is taken.

Figure 1B:
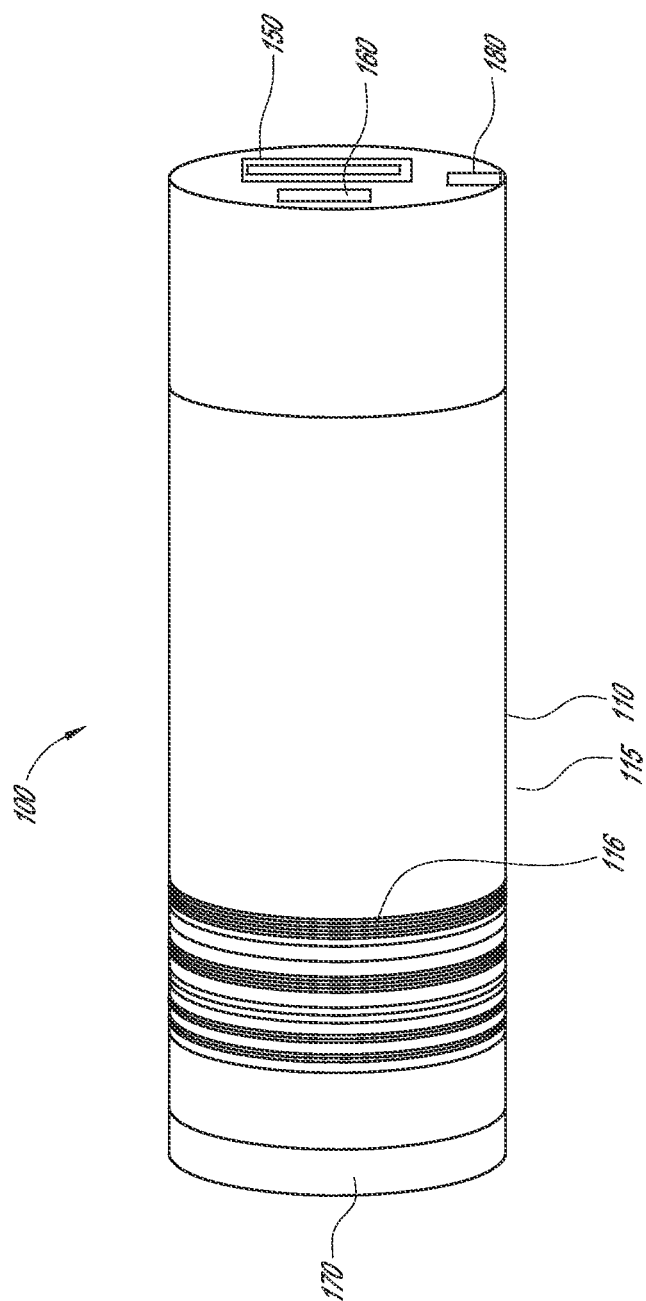
FIG. 1B is a view of an embodiment of a rechargeable power unit having a computer-readable identifier thereon.

As depicted in FIG. 1B, the cover 115 can have a computer-readable identifier 116, such as a bar code, QR code, RFID tag, or other identifier attached thereto or printed thereon, The computer-readable identifier 116 can encode a unique identifier for the specific rechargeable power unit 100 and a category identifier. In some embodiments, the computer-readable identifier 116 may encode a value or string which points a device reading the computer-readable identifier 116 to a database to retrieve specific information associated with the read encoded value or string. When the rechargeable power unit 100 is manufactured or labeled, the computer-readable identifier 116 can be stored in a database or other memory of a network associated with the rechargeable power units 100, such as battery exchange machines described herein and in the applications incorporated by reference. The database may be housed in the battery exchange machine, or may be accessible on a network via the battery exchange machine.

The category identifier may be a value or string which corresponds to a particular user, sponsor, industry, or other entity which owns, uses, or contracts to use a number of rechargeable power units 100. In some embodiments, the category identifier may be associated with a type of product, for example, a high capacity device, or unique voltage device.

To illustrate the use of the category identifier, the following example is provided. An entity, such as an airport, restaurant, mall, amusement park, government agency, or hotel may want to offer patrons, employees, or guests use of rechargeable power units 100. In the case of the hotel, the hotel may wish to offer its guests with rechargeable power units 100 while staying at the hotel. The hotel may be given a category identifier which affiliates the rechargeable power unit with the hotel in a database accessible by the owner or manufacturer of the rechargeable power unit 100 and/or the battery exchange machine network. When the rechargeable power unit 100 is deposited into or exchanged in a battery exchange machine, the battery exchange machine can read or access the category identifier and associate the category identifier with the hotel. The battery exchange machine or battery exchange machine network can then charge the hotel or a hotel account for use or exchange of the rechargeable power units 100. The battery exchange machine network can track usage, such as number of uses and length of use of hotel-associated rechargeable power units 100. In some embodiments, the battery exchange machine and its network can track the physical locations at which the hotel-associated rechargeable power unit 100 is used and provide this information to the hotel. Although the category identifier is described here with regard to a hotel, it is understood that the category identifier can be associated with any entity without departing from the scope of the present application.

In some embodiments, when the computer readable identifier 116 is read at a battery exchange machine, the battery exchange machine can read or identify the category identifier, and can provide a message to the user of the battery exchange machine. In some embodiments, the message can be a textual message providing an instruction, or a personalized message from the hotel. In some embodiments, the message can be a short video displayed on a screen of the battery exchange machine showing a features of the hotel, the logo of the hotel, or any other information the hotel desires to show. This is accomplished by the hotel providing media to the battery exchange machine network to be shown or played when a rechargeable power device having its category identifier thereon is scanned or received at the battery exchange machine.

In some embodiments, the computer-readable identifier 116 can be read by any device with reading capability, such as a smartphone, tablet computer, or PDA. The computer-readable identifier 116 can be read using an application on a smartphone. Upon scanning the computer-readable identifier 116, the smartphone application may access a database run by the owner or manufacturer of the rechargeable power devices that provides usage lifetime information or statistics for the particular rechargeable power unit 100. For example, a user may be able to check the number of exchanges or swaps performed at battery exchange machines for his rechargeable power unit 100 by scanning the computer-readable code using a specialized application.

Upon insertion of the rechargeable power unit 100 into the battery exchange machine, the battery exchange machine will select and send the correct authentication code, handshake, or other information to the rechargeable power unit 100 based on the read unique identifier.

In some embodiments, the category identifier can be encoded into the power input/output module 140. Thus, after the rechargeable power unit 100 is received into the battery exchange machine, the battery exchange machine may read the category identifier stored in the input/output module 140, and may initiate instructions which display a message, a video, or the like, associated with the category identifier, as described above.

In some embodiments, a message, such as a text message, image, or video can be stored in the input/output module 140 which is accessed by the battery exchange machine when the rechargeable power unit 100 is inserted. The battery exchange machine can then display the message stored in the input/output module 140.

In some embodiments, a message can be stored in the input/output module 140, and another message can also be linked to or associated with the category identifier, causing two or more messages to be displayed at a battery exchange machine.

In some embodiments, the input port 160 may comprise an additional unique port, electrode, or contact which must make contact with a corresponding port, electrode or contact in the power supply in order to initiate charging. When the power input/output module 140 detects a specific signal, such as a specific voltage, on the unique port, electrode, or contact, the power input/output module 140 will initiate charging. In some embodiments, the power input/output module 140 may require that a connector connected to a power supply or power source be inserted into both the input port 160 and the output port 150 in order to initiate charging.

In some embodiments, the functionality of the output port 150 and the input port 160 can be combined into a single port, capable of passing power in both directions through the power input/output module 140. Thus, a user may charge or discharge the one or more cells using a single connection port.

The outer casing may comprise a cap 170. The cap 170 may be disposed on the end of the outer casing which does not house the output port 150 and the input port 160. The cap 170 may advantageously be removable. The cap 170 may be removably attached to the outer casing 110. In some embodiments, the cap 170 may be threaded, snap-fit, friction fit, or otherwise removably attached to the outer casing 110.

Upon removal of the cap 170, access may be obtained to the one or more cells 120 within the outer casing 110 without interference from the circuitry of the cell connector 130 and the power input/output module 140. In some embodiments, the one or more cells 120 may be removable from the outer casing 110 through the opening in the outer casing 110 revealed upon removal of the cap 170. The other components housed within the outer casing, i.e., the cell connector 130, the power input/output module 140, etc., may be retained in place by connection to the internal surfaces of the outer casing 110, such that they are not easily removable from within the outer casing 110. In some embodiments, the one or more cells are loaded into a cell tray or cartridge (not shown), which holds the one or more cells 120 in their proper configuration within the outer casing 110, and slides in and out of the outer casing 110, allowing for easy removal and/or insertion of all of the one or more cells 120 at once. By allowing removal of the one or more cells 120 via the opening of the cap 170, spent, discharged, or used cells may be replaced with new, fresh, or charged cells, and the rechargeable power unit 100 may be quickly returned to use, without having to wait while charging the cells 120 via the input port 160.

There may be requirements imposed by regulatory agencies which require restricting access to cells having specific battery chemistries. For example, a regulatory agency may require a manufacturer to restrict access to Li-ion type battery cells. To restrict access in this fashion, the cap 170 may have a security feature which prevents a user from easily removing the cap 170. For example, the outer casing 110 may comprise an outer sheath which is tightly wrapped, shrink wrapped, or otherwise attached to the outer casing 110 which extends over the removable cap 170. The outer sheath may extend over the cap 170 such that the cap cannot be removed without cutting, breaking, destroying, or otherwise altering or removing the outer sheath. In some embodiments, the cap 170 may be threaded onto the outer casing and tightened securely so that the cap 170 is torqued greater than "finger-tight," so a tool is required to remove cap 170. By using a tool interface (not shown) which requires a specialized, proprietary, or otherwise uncommon tool for removal of the cap 170, the access restriction requirement may be met.

The casing 110 may include a removable top cap 171. By removing the top cap 171, access to the charging ports and the power input/output power module is available. To facilitate modular construction or easy replacement of defective, damaged, or broken components, the top cap 171 can enclose the power input/power module 140. Upon opening the top cap 171, the power input/output module can be removed from the casing 110, and disconnected from the one or more cells 120, and a new power input/output module 140 can be attached to the one or more cells 120. The top cap 171 can be reinstalled, and the rechargeable power unit 100 can be reused with the new component.

The rechargeable power unit 100 may be configured for use in a battery vending or exchange machine. To facilitate receipt of the rechargeable power unit 100 in the battery vending or exchange machine, the outer casing 110 may have an orientation feature 180. The orientation feature 180 may be a notch, indentation, depression, concavity, convexity, an alignment marking, or other similar feature which may be recognized by the battery vending or exchange machine.

For example, a user may desire to exchange a spent rechargeable power unit 100, but the user cannot remove the cap 170 due to access restrictions. The user may insert the rechargeable power unit 100 into a test port or receiving port on a battery vending or exchange machine. Upon receipt the battery vending or exchange machine may desirably test the state of charge or health of the rechargeable power unit 100. The battery vending or exchange machine may comprise a connector configured to be inserted into the output port 150 or the input port 160, such as a USB or microUSB connector. In order to efficiently ensure the rechargeable power unit 100 is oriented to make a connection with the connector of the battery vending or exchange machine, the orientation feature 180 is used. Where the orientation feature 180 is a notch, the notch 180 may align with a corresponding feature, such as a tab, or other mechanical alignment feature within the test or receiving port. The user may be unable to insert the rechargeable power unit 100 except in the orientation where the orientation feature 180 aligns with the corresponding feature in the test or receiving port.

In some embodiments, the orientation feature 180 may be a computer readable marking or similar feature capable of being recognized by the identification apparatus within the test or receiving port. The test or receiving port may be configured to rotate the rechargeable power unit 100 to align the output port 150 and/or the input port 160 with the test connection within the battery vending or exchange machine. The orientation feature 180 may be one of the many battery identifiers described elsewhere herein, e.g., barcodes, QR codes, RFID, and the like, such that it serves a dual purpose for both orientation and identification. The orientation feature 180 may be used to track and/or identify the rechargeable power unit 100 as described elsewhere herein.

Once the test connection is inserted into the output port 150, the input port 160, or both, the battery vending or exchange machine may conduct a diagnostic check of the rechargeable power unit 100. The battery vending or exchange machine may read the internal memory of the power input/output module 140 wherein the battery charge/discharge information is stored. The stored battery charge/discharge information may be compared to pre-defined parameters to gauge the health of the one or more cells 120. For example, the pre-determined parameters may relate to the number of charge/discharge cycles, the total amp-hours charged or discharged, or any other battery feature. If the number of charge/discharge cycles, total current charged or discharged, or any other stored battery information exceeds a pre-determined threshold, the rechargeable power unit 100 may be flagged for replacement of the one or more cells 120. If the stored battery information is within the normal parameters, the rechargeable power unit 100 may be transported to a recharging facility, port, connection, or charging hub where the one or more cells are recharged. The recharging of the rechargeable power unit 100 may advantageously be part of a two-way exchange procedure, where a fresh rechargeable power unit 100 is vended, sent, shipped, or otherwise provided to a user, and the spent rechargeable power unit 100 is recharged and readied for reuse by the same or another user.

The test connection of the battery vending or exchange machine may perform a diagnostic check to determine the health of the one or more cells 120 within the rechargeable power unit 100. The test connection may measure output voltage and/or current at the output port 150. The test connection may be instructed to conduct a test discharge and track voltage and current during the test discharge. For example, a loading current of 2 A may be briefly applied (as in a pulse) to the one or more cells 120 via the input port 160 while voltage is measured. During application of the current, an excessively low voltage (possibly due to high internal impedance or resistance of the cell) would indicate that a cell 120 is aged, bad, or malfunctioning. If this occurs, the battery vending or exchange machine may flag the rechargeable power unit 100 for replacement of the one or more cells 120. The testing method described above is exemplary only. A person of skill in the art will understand that many different testing and/or diagnostic methods may be used without departing from the scope of the present disclosure. In some embodiments, the output port 150 and/or the input port 160 can be used, either alone, or in combination, for testing and diagnostic purposes of the rechargeable power unit 100.

In some embodiments, when the rechargeable power unit 100 is inserted into the test or receiving port on the battery vending or exchange machine, the test connection made with the rechargeable power unit 100 may read the subscriber information, serial number, or other data stored in the internal memory of the power input/output module 140. In some embodiments, the battery vending or exchange machine may automatically recognize the account of the subscriber based on the stored subscriber information, and may automatically credit, debit, the subscriber's account, vend a fresh rechargeable power unit 100, or take other action as desired.

The rechargeable power unit may be vended with or combined in a kit with a charge/discharge cable, cable adaptors, and other desirable items. For example, the kit may have a cable with a USB connector at one end, and a microUSB connector at another end. The cable adaptors can be adaptors that convert a microUSB connector to a 30-pin connector, miniUSB, or any other desired connector. In some embodiments, the cable and/or cable adaptors may have a computer-readable unique identifier embedded or attached thereto. For example, the cable and cable adaptors may have a magnetic strip, RFID tag, QR code, barcode, or any other desired identifier. In some embodiments, the unique identifier may be on a tear-resistant adhesive sheet material which is attached to the cable. The cable and cable adaptors may be vended, exchanged, and tracked similar to the ways the rechargeable power unit 100 may be vended, exchanged, tracked, etc. described herein. In some embodiments, the rechargeable power unit 100 and cable may be exchanged or vended as a unit, in a kit, individually, or separately.

Figure 2:
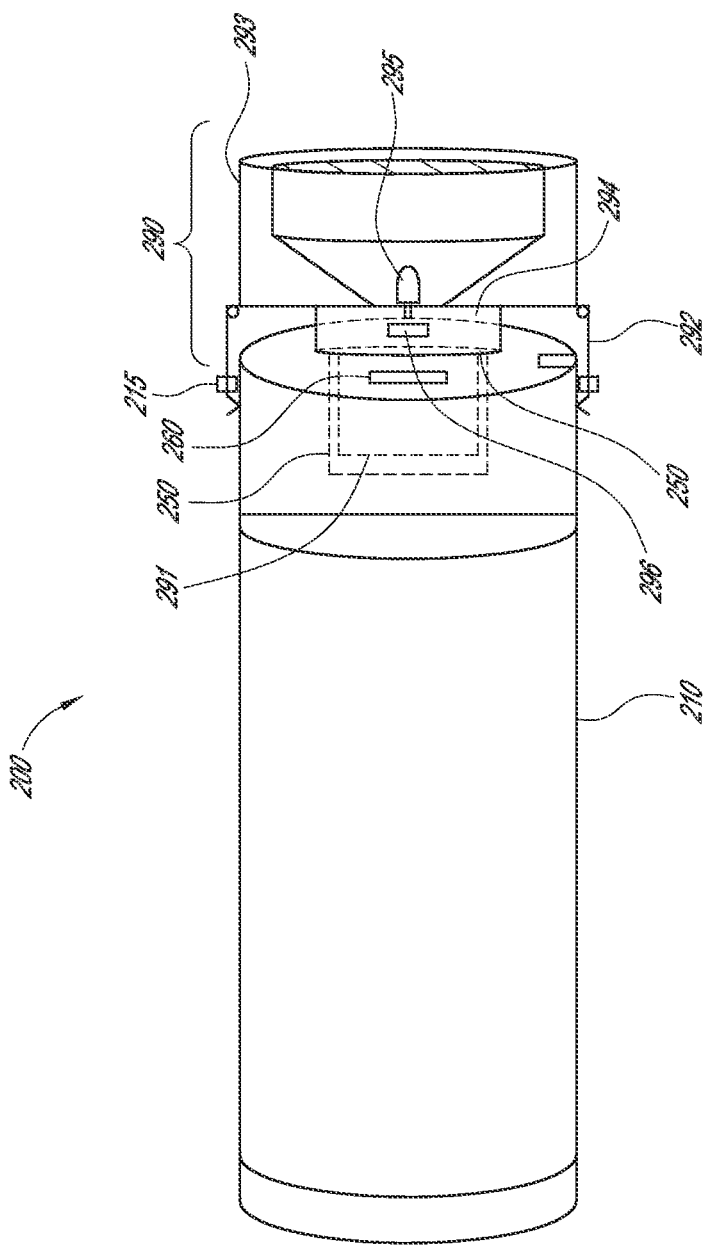
FIG. 2 is a perspective view of a rechargeable power unit with an interchangeable attachment.

FIG. 2 depicts a rechargeable power unit connected to an interchangeable attachment. A rechargeable power unit 200 may be configured to receive any number of interchangeable attachments, each of which provides a different functionality but requires an electrical power supply. For example, an interchangeable attachment may be a light source, such as an LED or other light, an electric razor, a toy, a game controller, a remote control, a toothbrush, shaver, trimmer, clipper, massager, electric hand tools, such as a Dremel tool, a vacuum cleaner, a laser pointer, a golf range finder, a GPS unit, a wireless keyboard or mouse, and many others. Such an arrangement may be desirable for using electrical appliances which typically have a handle or are handheld. In these applications, the rechargeable power unit 200 functions as a handle, providing a surface a user may grasp or support in a hand. Although FIG. 2 depicts only one type of interchangeable attachment, a person of skill in the art would understand that other attachments may be used without departing from the scope of this application.

The rechargeable power unit 200 includes a case 210, an output port 250, and an input port 260. The internals and operation of the rechargeable power unit 200 may be similar to those described elsewhere herein. Rechargeable power unit 200 includes a mechanical attachment mechanism 215. The mechanical attachment mechanism is depicted as a tab or protuberance on the case 210 which is sized and shaped to receive a corresponding latch, which will be described in greater detail below. Although FIG. 2 depicts only one type of mechanical attachment mechanism 215, a person of skill in the art will understand that other types of mechanical attachment mechanisms 215 may be employed without departing from the scope of this disclosure. For example, the mechanical attachment mechanism may 215 may be a threaded adaptor, a hook, clasp, strap, catch, hook and loop fastener, a friction fit surface, or any other desired mechanism.

As depicted, an interchangeable attachment 290 is attached to the rechargeable power unit 200. The interchangeable attachment includes a connector 291, and an attachment element 292. The connector 291 is configured to correspond to the output port 250. Thus, the connector 291 is inserted into the output port 250 and makes electrical contact with the output port 250 and corresponding circuitry within the rechargeable power unit 200. In some embodiments the connector 291 may be a male USB-type connecter, or may be any other desired connector sized and shaped to be inserted into the output port 250. Upon insertion of the connector 291 into the output port 250, an electrical connection is made, and power may flow from the rechargeable power unit 200 to the interchangeable attachment 290. Also upon insertion of the connector 291, one or more attachment elements 292 are brought into proximity to the mechanical attachment mechanism 215 on the rechargeable power unit 200. The attachment elements 292 are mechanically connected to the mechanical attachment mechanism(s) 215, and the interchangeable attachment 290 may be securely and removably held against case 210. Thus, the connector 291 is securely retained within the output port 250. As depicted, interchangeable attachment 290 is a flashlight type accessory, and includes a housing 293, an electronics portion 294, a light emitting diode 295, and a switch 296. The electronics portion 294 includes circuitry in electrical contact with the connector 291 and the switch 296, and the LED 295. The electronics portion 294 may also include transforming, rectifying, or other circuitry to convert the output voltage/current from the output port 250 to a voltage, current, phase, etc. useable for the interchangeable attachment 290. In operation, when the switch 296 is operated, a current path is established between the connector 291 and the LED 295 via the electronics portion 294, and the LED is illuminating, drawing on electricity from the rechargeable power unit 200.

The rechargeable power unit 200 can be designed to have various electrical characteristics based on the number and type of cells 120 which are used. In some embodiments, rechargeable power units 200 may be of a variety of sizes and capacities, e.g., large capacity, mid-capacity, and low capacity. The output voltage and current may vary as desired. In some embodiments, the output voltage may be approximately 5.0 volts, and may be designed according to the USB standard. In some embodiments, the output current may be from about 0.5 A to about 2.0 A. In some embodiments, the power may be from about 2.5 to 5 W, and the capacity can be from about 5-40 Wh. The above specifications are exemplary only, and are not intended to limit this disclosure to the specific values. A person of skill in the art would understand that the electrical specifications can vary without departing from the scope of this disclosure.

Figure 3A:
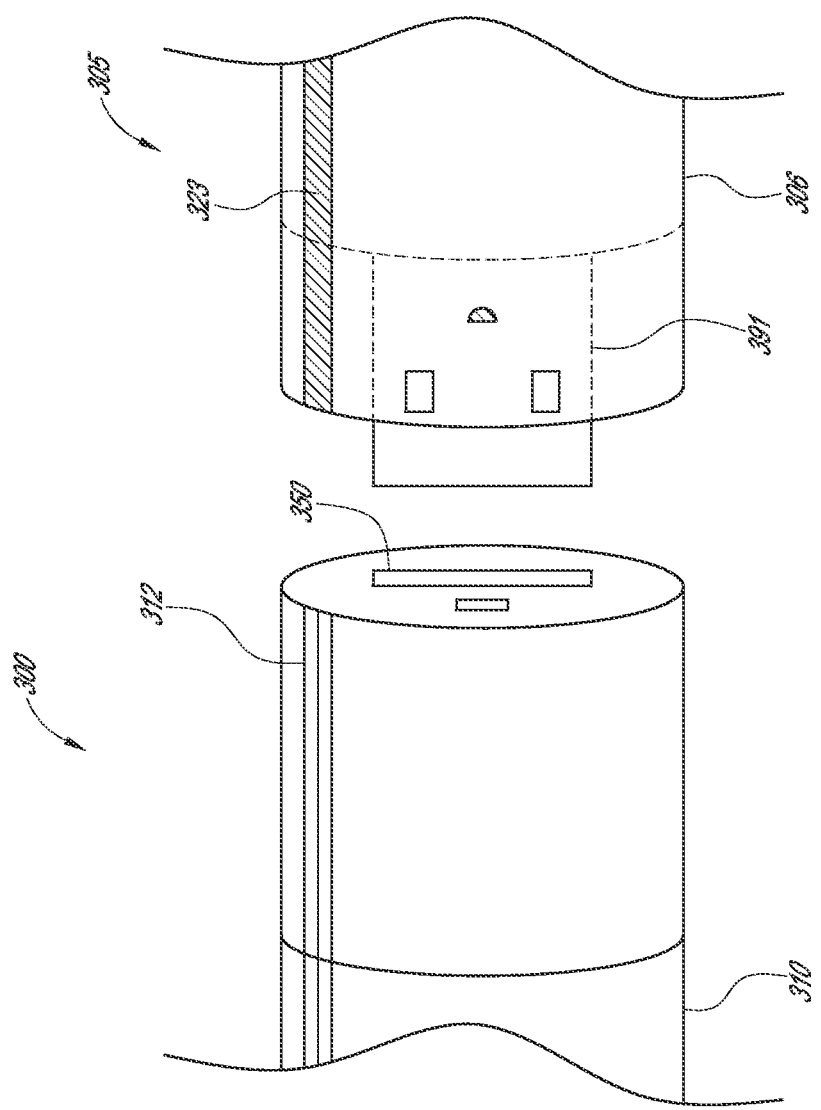
FIG. 3A is a perspective view of an embodiment of a rechargeable power unit having an alignment feature.

FIG. 3A depicts an embodiment of a rechargeable power unit having an alignment feature. Rechargeable power unit 300 includes a casing 310, an output port 350, and an alignment feature 312. The alignment feature 312 is depicted as a groove formed in the casing 310 extending along a certain length of the rechargeable power unit. In some embodiments, the alignment feature 312 may be a raised portion or planar visual marking. In some embodiments, the alignment feature 312 may extend along the entire length of the rechargeable power unit. In some embodiments, the alignment feature may extend only a certain length along the rechargeable power unit.

The rechargeable power unit 300 can be used in standardized applications, such as in everyday battery-powered appliances. These may include remote controls, radio controlled vehicles, toys, clocks, alarms, or any other appliance which requires electricity to operate. Normal battery powered appliances have a space or compartment for one or more standard form factor batteries. The compartment on these devices may be modified to accept one or more rechargeable power units 300. Because, in some embodiments, the output port 350 may be of a shape or size different from a terminal of a standard form factor battery, the alignment feature 312 may be used to ensure proper alignment of the rechargeable power unit 300 when inserted into the compartment of a battery-powered appliance. To accommodate a rechargeable power unit 300, the standard battery-powered appliance can be modified to receive a rechargeable power unit 300 and connect to the output port 350. FIG. 3A depicts a connection portion 305 of a battery-powered appliance suitable for use with a rechargeable power unit 300. The connection portion 305 includes a housing 306 and a connector 391, depicted here as a USB connector, but embodiments of the present disclosure are not limited thereto. The housing 306 may be part of a battery-powered appliance, a charging or discharging apparatus in a battery exchange machine or charger, or any other application which can utilize the energy stored within the rechargeable power unit 300.

The connection portion 305 also includes an alignment feature 323, which corresponds to the rechargeable power unit 300 such that the alignment feature 312 and alignment feature 323 will be aligned when the connector 391 is aligned for proper insertion into output port 350. The alignment feature 323 can be a raised portion or a groove, or a planar visual marking, corresponding to the alignment feature 312, which is sized or shaped to prevent movement of the rechargeable power unit 300 into the housing 306 if the alignment features 312 and 323 are not aligned properly. Thus, if the alignment feature 312 and 323 are not properly aligned, the connector 291 will be prevented from being inserted into the output port 350, which will prevent misalignment, damage, or improper operation to both the rechargeable power unit 300 and connection portion 305.

The alignment feature 312 may extend along the length of the casing 310 a distance equal to the length of the connector 391 in order to allow the connector to be fully inserted into the output port 350. In some embodiments, one or more alignment features 312 may be included on the casing 310, and one or more corresponding alignment features 323 may be disposed within the connection portion 305. The connection portion 305 may also include components or features described elsewhere herein with reference to interchangeable attachments.

In some embodiments, the casing 310 can be of a shape corresponding to the housing 306. For example, the casing 310 may be generally cylindrical, but may have a flattened portion on one side, or the casing 310 may be beveled or asymmetrical about one or more axes. The housing 306 can reflect the shape of the casing 310. When the shapes of the casing 310 and the housing 306 are aligned, the rechargeable power unit 300 may be inserted into the housing, and will be in the proper alignment for connection between the connector 391 and the output port 350.

Figure 3B:
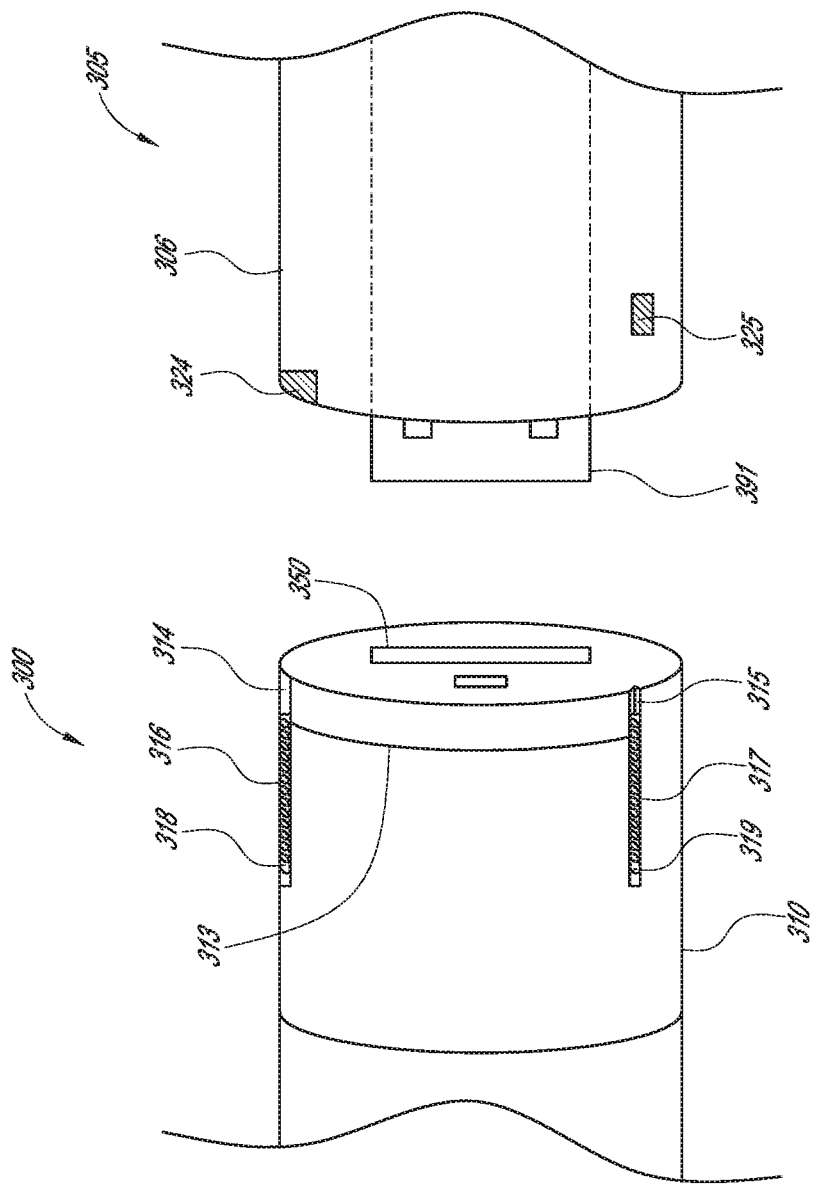
FIG. 3B is a perspective view of an embodiment of a rechargeable power unit having an interlocked, keyed alignment feature.

FIG. 3B depicts an embodiment of ensuring alignment having a keyed function. The casing 310 includes two keying features 314 and 315. The keying features 314 and 315 are interlocked with each other, via an interlocking feature 313, such that keying feature 315 can only be operated or depressed after keying feature 314 is depressed. The interlocking keying features 314 and 315 ensure that the rechargeable power unit 300 is not connected upside down, or in the wrong orientation, relative to the connector 391. The keying features 314 and 315 may be located opposite each other on the casing 310, although the present disclosure is not limited thereto.

The keying features 314 and 315 are connected within channels 316 and 317 and a resistance member 318 and 319 disposed within the channels 316 and 317 respectively. The resistance members 318 and 319 can be springs, elastic members, or other resilient objects which provide some resistance to compression as the keying features 314 and 315 are forced into channels 316 and 317, respectively. Corresponding keying features 324 and 325 are located on the housing 306. The keying features 324 and 325 are located at different distances from an open end of the housing 306.

When the rechargeable power unit 300 is brought into the housing, if keying feature 314 is not aligned with keying feature 324, the rechargeable power unit cannot be inserted into the housing, thus preventing misalignment of the connector 391 and the output port 350. As the rechargeable power unit 300 is inserted into the housing with the keying feature aligned with keying feature 324, the keying feature 324 contacts the keying feature 314, which depresses into the channel against the force of the resistance member 318. While inserting the rechargeable power unit 300 into the housing 306, as keying feature 324 contacts keying feature 314, the keying feature 314 is forced into channel 316 against the resistance member 318, and activates the interlocking feature 313. Thus, after keying feature 314 is forced into the channel 316, keying feature 315 is moveable within the channel 317. As the rechargeable power unit 300 is inserted further into the housing 306, the keying feature 325 contacts keying feature 315, which is likewise forced into the channel 317. Thus, the rechargeable power unit 300 can be inserted such that the connector 391 is fully inserted into the output port 350.

If the rechargeable power unit 300 were inserted into the housing 306 upside down, keying feature 324 would contact the keying feature 315. Because of the interlocking feature 313, keying feature 315 would not be forced into the channel 317, and the rechargeable power unit 300 cannot be inserted into the housing 306. Because keying feature 325 is located at a different distance from the open end of the housing than keying feature 325, keying feature 314 does not contact keying feature 325, and, therefore, the interlocking feature 313 is not defeated, and the rechargeable power unit 300 cannot be inserted.

Figure 3C:
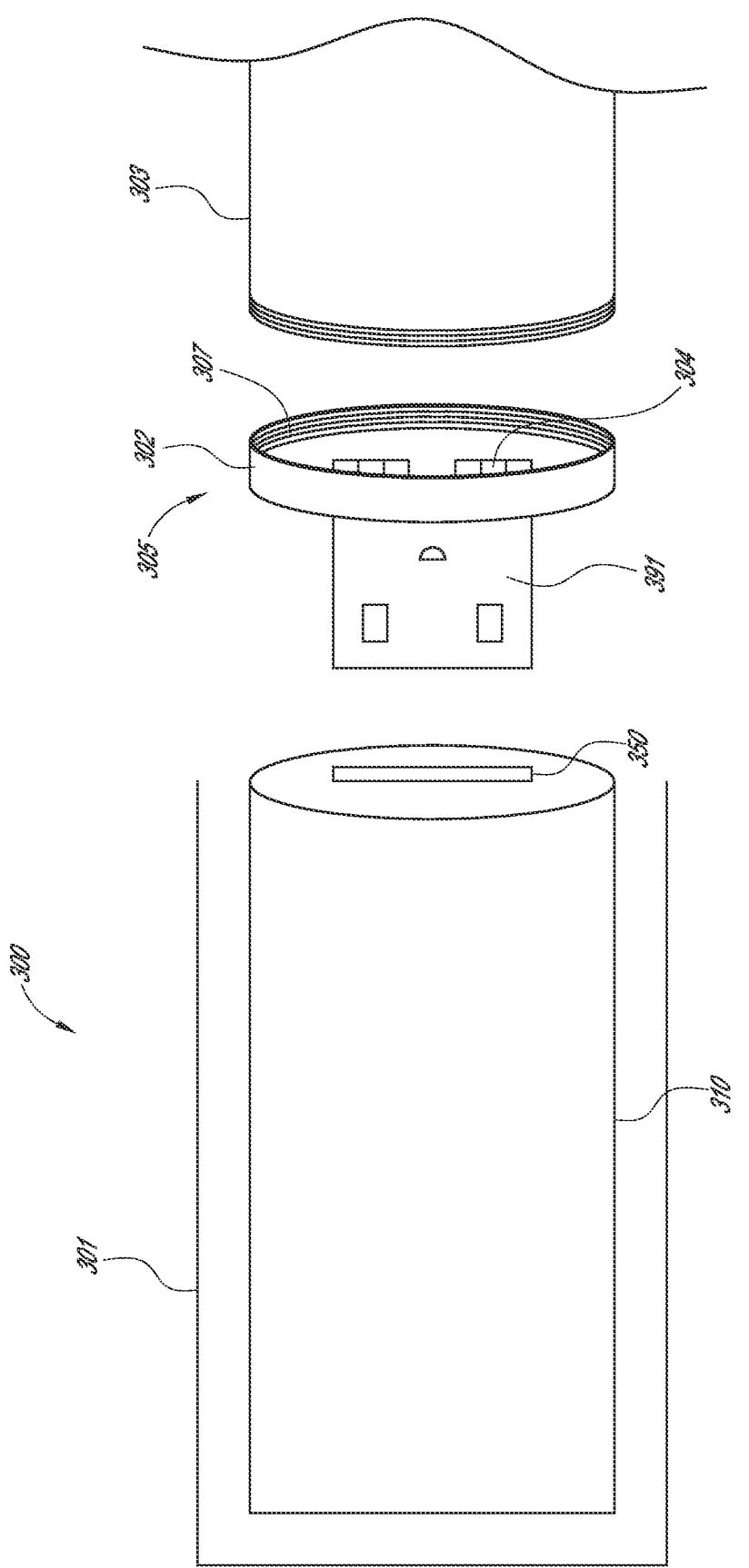
FIG. 3C is a perspective view of a connection mechanism for connecting a rechargeable power unit for a standardized application.

FIG. 3C depicts an embodiment of an appliance having a standardized receptacle for a rechargeable power unit. An appliance or electric apparatus may be configured to receive and utilize rechargeable power unit 300 as a standard power source. Thus, the rechargeable power unit 300 can replace standard form factor batteries in a variety of applications. The rechargeable power unit 300 is depicted in a compartment 301. The compartment 301 can be a part of an electric appliance or device 303. To facilitate installation or connection of the rechargeable power unit 300 to the appliance or device 303, the appliance or device 303 has a connection portion 305 which is removable from the appliance or device 303. The connection portion 305 includes a body 302, the connector 391, and electrical contacts 304. The body houses the electrical contacts 304, and the electrical contacts are connected to the connector 391. The body includes an attachment feature 307. The attachment feature is configured to connect the body 302 to the appliance or device 303, and is configured to connect such that the electrical contacts 304 make electrical contact with corresponding electrical components (not shown) in the appliance or device 303. As shown, the attachment feature 307 is a threaded surface configured to mate with corresponding threads on the appliance or device 303. The threaded surface may be on an inside circumference of the body 302 or on the outside circumference of body 302. Although a threaded attachment feature 307 is depicted, the present disclosure is not limited thereto. For example, in some embodiments, the attachment feature 307 may be a surface sized to attach to the appliance or device 303 via a friction fit. In some embodiments, the attachment feature 307 may be a latch, hook, clasp, clip, or other similar releasable attachment feature.

To use the rechargeable power unit 300 in an appliance or device, a user can first connect the connection portion to the rechargeable power unit. This can be accomplished by visually aligning the connector 391 with the output port 350. Because the rechargeable power unit 300 can be connected to connector 391 outside the appliance or device 303, this can be easily accomplished. After connecting the connector 391 to the output port 350, a user can then connect the connection portion 305 to the appliance or device 303. The electrical contacts 304 are placed so that regardless of the orientation of the connection portion 305, the electrical contacts 304 make positive electrical connection to the circuitry of the appliance or device, and the device can operate properly. Thus, a user can connect the rechargeable power unit 300 to the appliance or device via the connection portion 305 in a variety of orientations.

Figure 4:
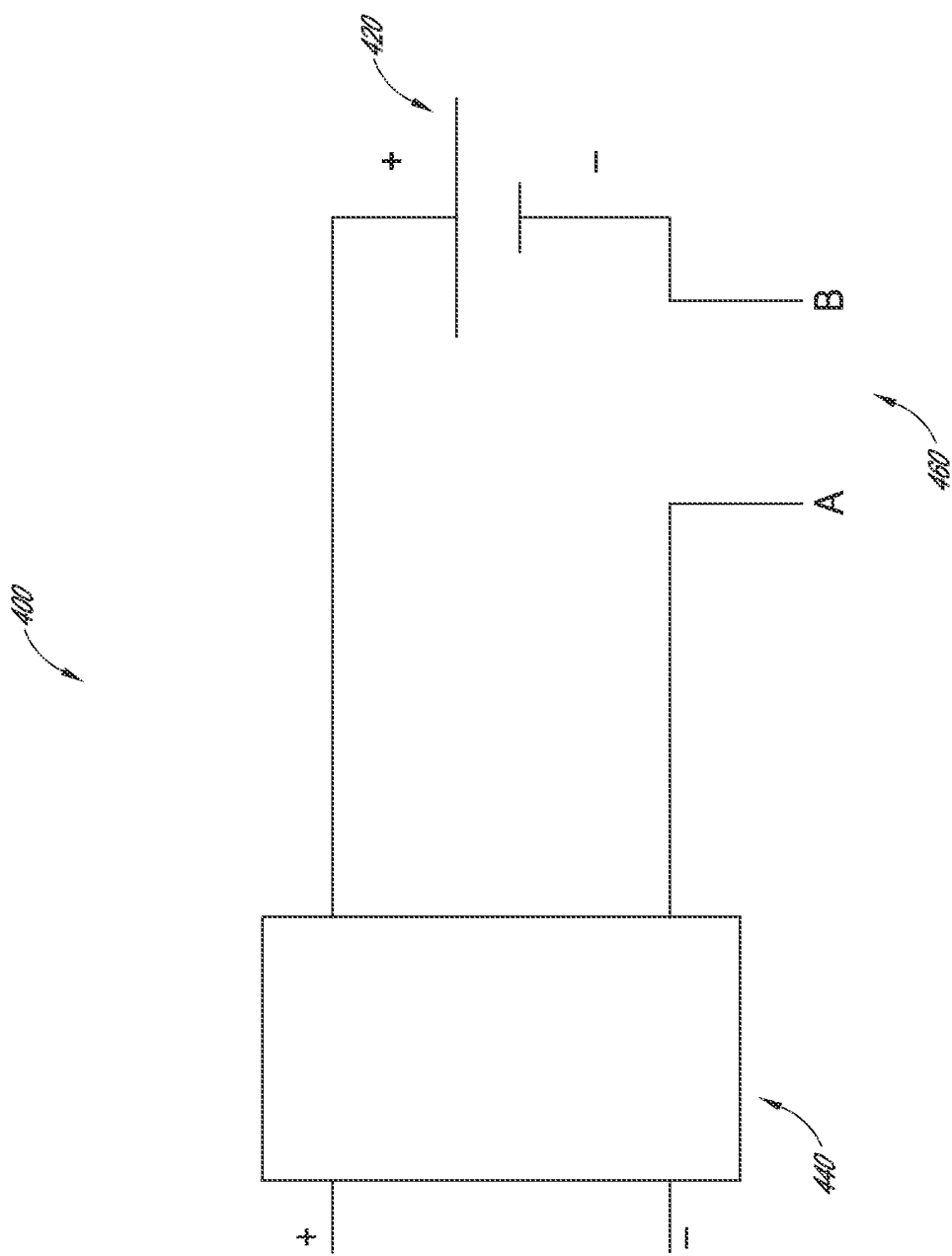
FIG. 4 is a circuit diagram of an embodiment of a rechargeable power unit which reduces loading on the cell when the cell is not in use.

FIG. 4 depicts an embodiment of a circuit which reduces loading on the electric cells of a rechargeable power unit when a charging cable or connector is not inserted into the charging port. Circuit 400 illustrates a cell 420 connected to an power input/output module 440, providing both a positive and a negative terminal which is configured to connect to a load through, for example, an output port (not shown). A charging port 460 having terminals A and B is connected to the circuit 400, with terminal B connected to the negative terminal of the cell 420. Terminals A and B correspond to a charging port 460. When a connector is inserted into a charging port, terminals A and B are brought into electrical contact with each other. Otherwise, where no connector is inserted, terminals A and B are electrically isolated. This electrical isolation can prolong battery shelf life when the rechargeable power unit is not in use, or is not connected to a power source or a load. The embodiment of FIG. 4 is exemplary only, and one of skill in the art will understand that the circuit may be modified by switching polarities, connection terminals, and other features without departing from the scope of the present disclosure.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An electric device comprising:
   a battery compartment;
   a rechargeable power unit configured to be disposed in the battery compartment the rechargeable power unit comprising:
      an electrochemical cell;
      an input/output module in electrical connection with the electrochemical cell; and
      a casing housing the electrochemical cell and the input/output module; and
   a connection portion removably connected to the battery compartment, the connection portion comprising:
      a connector configured to be removably received within an output port of the rechargeable power unit and to provide a path for current flow from the rechargeable power unit to circuitry of the electric device; and
      a body housing electrical contacts connected to the connector, the body partially surrounding the connector.

2. The electric device of claim 1, wherein the battery compartment is sized to receive the rechargeable power unit.

3. The electric device of claim 1, wherein the body of the connection portion is configured to receive a portion of the rechargeable power unit as the connector is received into the output port.

4. The electric device of claim 1, wherein the battery compartment is configured to receive one or more standard form factor batteries when the connection portion is removed.

5. The electric device of claim 4, wherein the electrical contacts are configured to allow the rechargeable power unit to replace the one or more standard form factor batteries when the connection portion is connected to the battery compartment.

6. The electric device of claim 4, wherein the battery compartment is unable to electrically connect to the rechargeable power unit when the connection portion is removed.

7. The electric device of claim 1, wherein the body comprises an alignment feature configured to align the connection portion with the rechargeable power unit.

8. The electric device of claim 7, wherein the alignment feature extends along a side of the body adjacent to a side of the body from which the connector extends.

9. The electric device of claim 8, wherein the alignment feature extends a length along the body equivalent to a length of the connector configured to be received in the output port.

10. The electric device of claim 8, wherein the alignment feature comprises a raised portion, a groove, and/or a visual marking.

* * * * *